(12) United States Patent
Shigeta et al.

(10) Patent No.: US 7,950,503 B2
(45) Date of Patent: May 31, 2011

(54) ELECTRIC DISK BRAKE, CALIPER FOR THE ELECTRIC DISK BRAKE, MOTOR/CONTROLLER UNIT FOR THE ELECTRIC DISK BRAKE, AND METHOD FOR ASSEMBLING THE CALIPER FOR THE ELECTRIC DISK BRAKE

(75) Inventors: Hiroshi Shigeta, Minami-ALPS (JP); Takayasu Sakashita, Minami-ALPS (JP)

(73) Assignee: Hitachi, Ltd., Tokyo (JP)

( * ) Notice: Subject to any disclaimer, the term of this patent is extended or adjusted under 35 U.S.C. 154(b) by 252 days.

(21) Appl. No.: 11/723,313

(22) Filed: Mar. 19, 2007

(65) Prior Publication Data

US 2007/0227838 A1  Oct. 4, 2007

(30) Foreign Application Priority Data

Mar. 31, 2006  (JP) .................................. 2006-099761

(51) Int. Cl.
*F16D 55/08* (2006.01)
(52) U.S. Cl. ....... 188/72.1; 188/71.9; 188/156; 188/162
(58) Field of Classification Search .................. 188/72.1, 188/71.9, 72.7, 156, 161, 162, 265
See application file for complete search history.

(56) References Cited

U.S. PATENT DOCUMENTS

| | | | |
|---|---|---|---|
| 5,915,504 A * | 6/1999 | Doricht | 188/72.1 |
| 6,325,182 B1 * | 12/2001 | Yamaguchi et al. | 188/72.8 |
| 6,367,592 B1 * | 4/2002 | Kapaan et al. | 188/72.1 |
| 6,374,958 B1 | 4/2002 | Usui et al. | |
| 6,626,270 B2 * | 9/2003 | Drennen et al. | 188/72.1 |
| 6,810,316 B2 | 10/2004 | Yokoyama et al. | |
| 6,902,241 B2 * | 6/2005 | Yamamoto et al. | 303/122 |
| 6,907,967 B1 * | 6/2005 | Kapaan et al. | 188/162 |
| 2006/0163013 A1 | 7/2006 | Rieth et al. | |

FOREIGN PATENT DOCUMENTS

| | | |
|---|---|---|
| DE | 100 16 162 | 3/2001 |
| DE | 10 2004 012355 | 9/2004 |
| EP | 1 308 321 | 5/2003 |
| JP | 2000-304076 | 10/2000 |
| JP | 2003-137081 | 5/2003 |
| WO | 99/37010 | 7/1999 |
| WO | 2004/016965 | 2/2004 |

OTHER PUBLICATIONS

European Search Report issued Jul. 3, 2009 in corresponding European Patent Application No. 08 164 820.6-2423.

* cited by examiner

*Primary Examiner* — Robert A Siconolfi
*Assistant Examiner* — Mariano Sy
(74) *Attorney, Agent, or Firm* — Wenderoth, Lind & Ponack, L.L.P.

(57) ABSTRACT

An electric disk brake that can be operated and inspected before being assembled and that can be assembled easily. A piston, a ball ramp mechanism, a differential reduction mechanism, and a pad wear compensation mechanism are integrated to form a piston unit. A motor, a resolver, and a drive controller are integrated to form a motor/controller unit. The piston unit is inserted into a cylinder of a caliper body, and the motor/controller unit is mounted on the caliper body to assemble an electric caliper. Before being incorporated into the electric caliper, the motor/controller unit can be operated and easily inspected for any defect by applying an electric current to the motor/controller unit.

17 Claims, 11 Drawing Sheets

ELECTRIC DISK BRAKE, CALIPER FOR THE ELECTRIC DISK BRAKE, MOTOR/CONTROLLER UNIT FOR THE ELECTRIC DISK BRAKE, AND METHOD FOR ASSEMBLING THE CALIPER FOR THE ELECTRIC DISK BRAKE

BACKGROUND OF THE INVENTION

1. Technical Field

The present invention relates to an electric disk brake having an electric motor to press a brake pad against a disk rotor to exert a braking force; a caliper for the electric disk brake; a motor/controller unit adapted for use in the electric disk brake; and a method for assembling the caliper for the electric disk brake.

2. Related Art

Examples of electric disc brakes are disclosed in Japanese Patent Public Disclosure No. 2000-304076, and in Japanese Patent Public Disclosure No. 2003-137081. In these references, electric disc brakes are described which use a rotary-to-linear motion conversion mechanism such as a ball screw mechanism or a ball ramp mechanism to convert a rotary motion of a rotor of an electric motor to a linear motion of a piston, which is adapted to press a brake pad against a disk rotor to exert a braking force. Further, these electric disk brakes use a sensor to detect a force (or an amount of displacement) which a driver applies to a brake pedal. Based on a detected value, rotation of the electric motor is controlled to exert a desired braking force.

In the electric disk brake disclosed in Japanese Patent Public Disclosure No. 2000-304076, a claw portion of a brake caliper is provided with a ball ramp mechanism, a speed reduction mechanism, and so on, each of which are sub-assembled to form an opening/closing mechanism. Further, an electric motor, a rotational-position sensor, and so on are sub-assembled in a case and a cover to form a motor mechanism. Subsequently, the opening/closing mechanism and the motor mechanism are joined together in an assembling process. The assembling process, which involves sub-assembly steps for the mechanisms mentioned, is aimed at improving assembly efficiency.

The electric disk brake disclosed in Japanese Patent Public Disclosure No. 2003-137081 is provided with a drive controller for controlling operation of an electric motor, the drive controller being integrated into a brake caliper to simplify wiring of a power line and a control-signal line connecting a vehicle-mounted controller, which is mounted on a vehicle body, and a brake caliper so as to reduce an adverse effect of noise and a power loss.

However, in Japanese Patent Public Disclosure No. 2000-304076, the electric motor and its drive controller are placed apart from each other and are connected via a cable. This structure is prone to problems such as the adverse effect of noise and power loss.

On the other hand, in Japanese Patent Public Disclosure No. 2003-137081, constituent components including the piston, the rotary-to-linear motion conversion mechanism, the electric motor, and the drive controller are required to be individually incorporated into the brake caliper. This makes assembling and disassembling operations complicated. Further, an operation check can be conducted only after all of the constituent components have been assembled. This makes it difficult to detect any defect in each component during a manufacturing or repairing process.

SUMMARY OF THE INVENTION

The present invention is made in view of the above-described problems. An object of the present invention is to provide an electric disk brake having constituent units that can be operated and inspected before being assembled and that can be assembled easily, a caliper for the electric disk brake, a motor/controller unit for the electric disk brake, and a method for assembling a caliper for the electric disk brake.

The present invention provides a caliper for an electric disk brake, the caliper comprising:
 a pressing member for pressing a brake pad;
 an electric motor;
 a rotary-to-linear motion conversion mechanism for converting a rotary motion of the electric motor to a linear motion to transmit the linear motion to the pressing member, the pressing member being moved forward according to rotation of the electric motor to press the brake pad against the disk rotor to exert a braking force; and
 a motor/controller unit which is formed by integrating the electric motor and the controller for controlling the electric motor.

Further, the present invention provides a motor/controller unit for an electric disk brake, the motor/controller unit comprising:
 a motor, the motor being adapted to be operably connected to a rotary-to-linear motion conversion mechanism of the electric disk brake for converting a rotary motion of the motor to a linear motion to apply a pressure to a brake pad; and
 a controller for controlling the motor, the controller being integrated with the motor.

Further, the present invention provides a method for assembling a caliper for an electric disk brake for pressing a brake pad against a disk rotor to exert a braking force,
 the caliper including:
 a pressing member for pressing a brake pad;
 a motor; and
 a rotary-to-linear motion conversion mechanism for converting a rotary motion of the motor to a linear motion to transmit the linear motion to the pressing member, such that the motor is rotated by a controller for controlling the motor, and the pressing member is moved forward according to rotation of the motor,
 the method comprising:
 a first assembling step for integrating the motor and the controller to form a motor/controller unit; and
 a second assembling step for mounting the motor/controller unit on the caliper.

Further, the present invention provides an electric disk brake including a caliper that has a pressing member for pressing a brake pad; a motor; a rotary-to-linear motion conversion mechanism for converting a rotary motion of the motor to a linear motion to transmit the linear motion to the pressing member, the pressing member being adapted to move forward according to rotation of the motor to press the brake pad against the disk rotor to exert a braking force, wherein,
 the caliper defines a cylinder for containing the piston, the rotary-to-linear motion conversion mechanism, and the motor; and
 the motor is integrated as a motor unit including a motor stator, a motor rotor, and a motor case for containing the motor stator and the motor rotor, an outer circumferential portion of the motor case being abutted on an inner circumferential portion of the cylinder to support the motor.

DETAILED DESCRIPTION OF THE PREFERRED EMBODIMENTS

Figure 1:
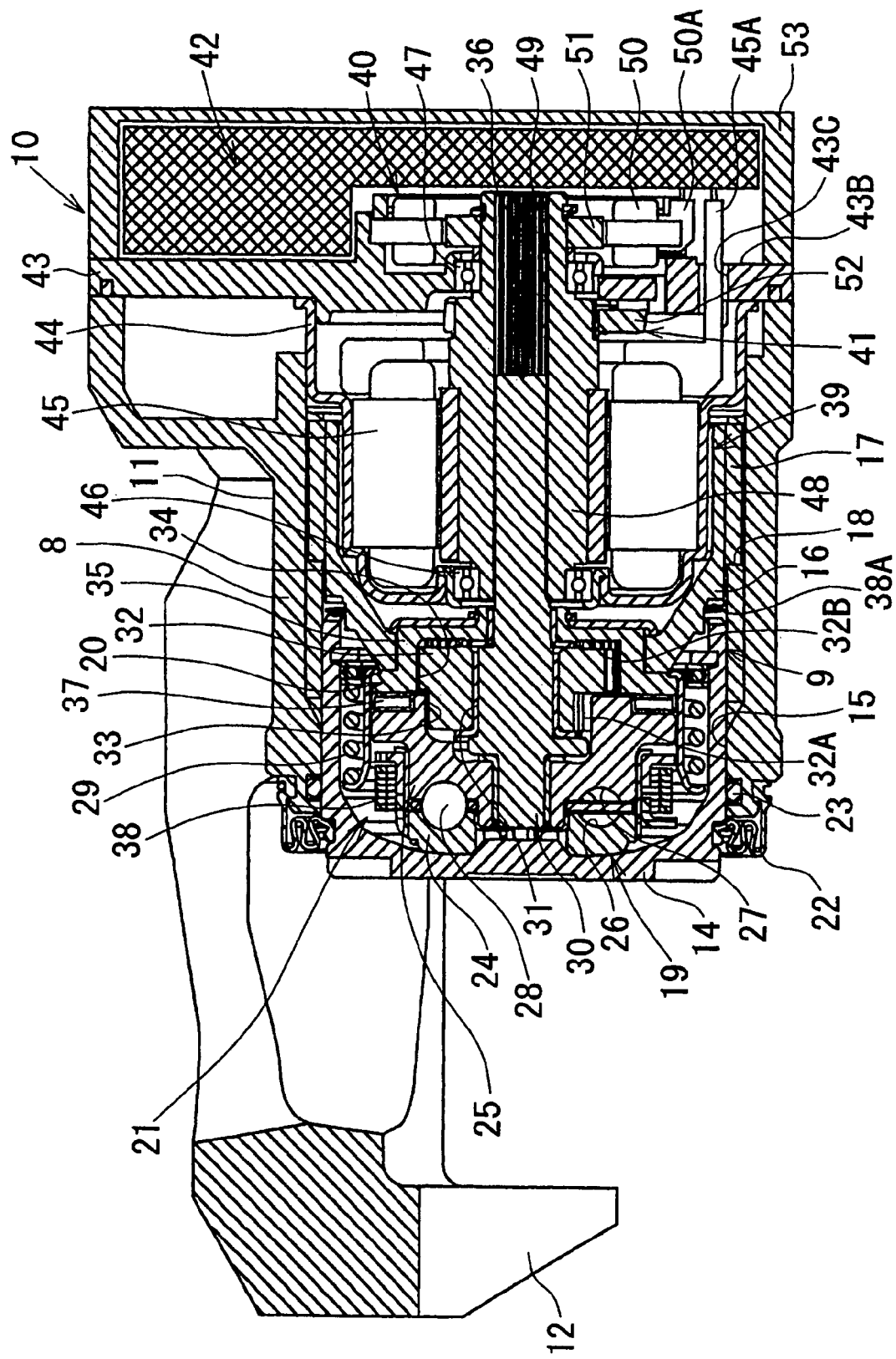
FIG. 1 is a longitudinal cross-sectional view of an electric caliper of an electric disk brake according to a first embodiment of the present invention.
Figure 2:
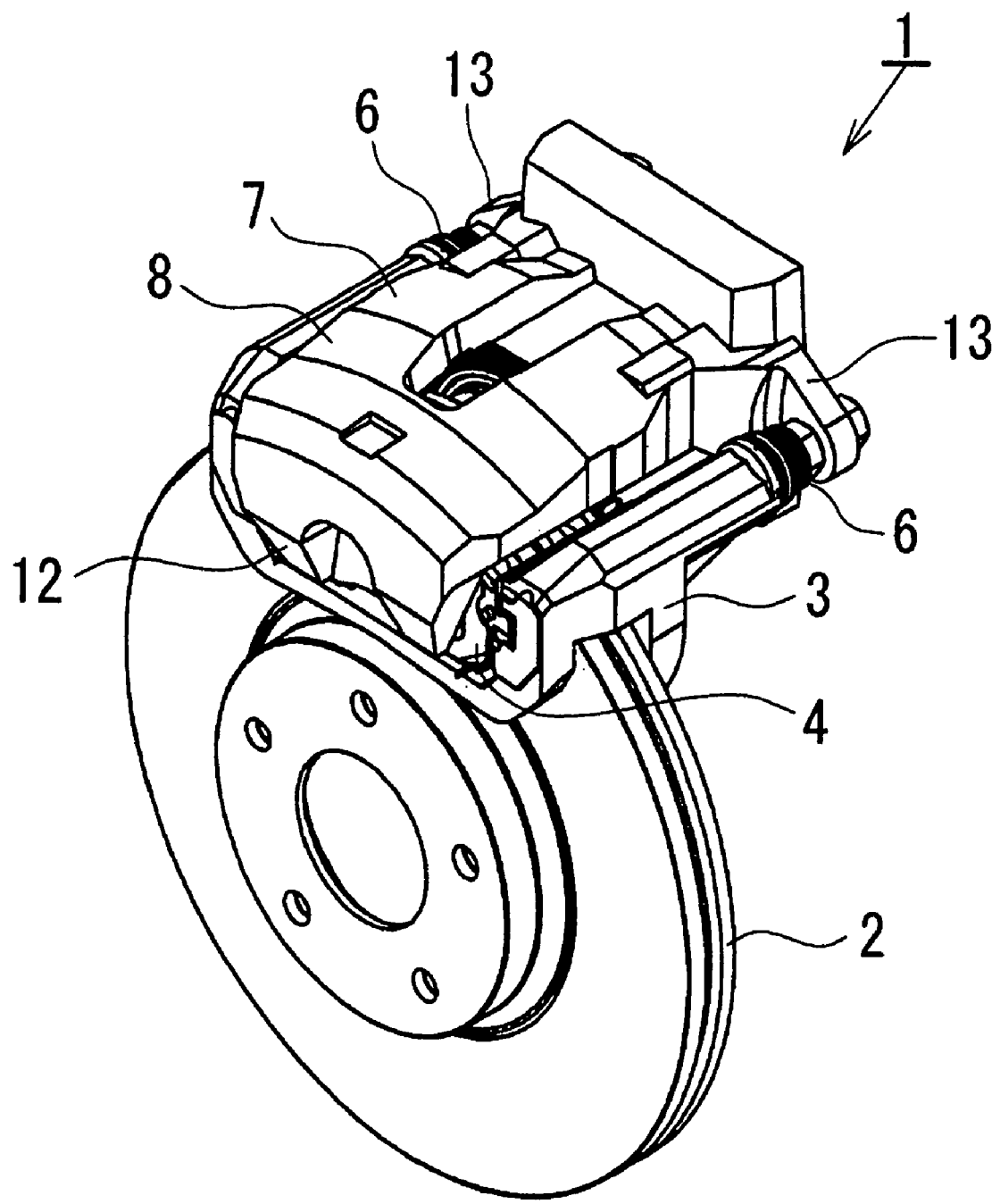
FIG. 2 is a perspective view of the electric disk brake according to the first embodiment of the present invention.
Figure 3:
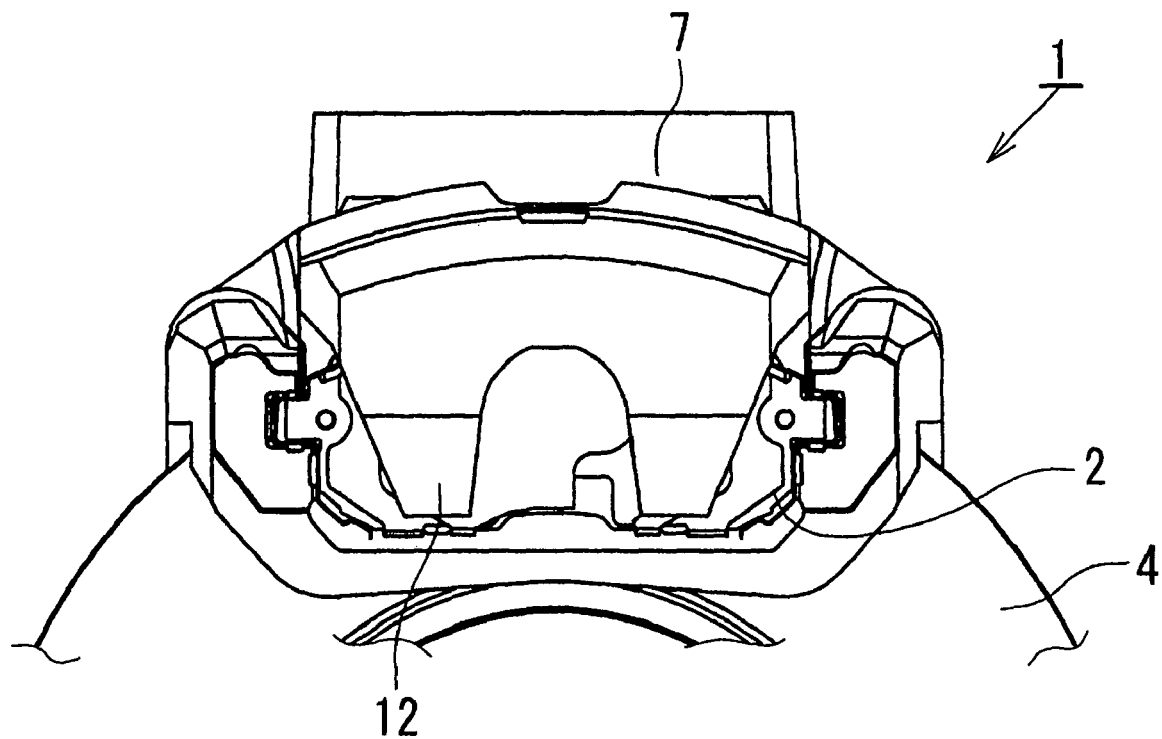
FIG. 3 is a side view of the electric disk brake of FIG. 2 as it appears when it is viewed from a claw portion of the electric disk brake.
Figure 4:
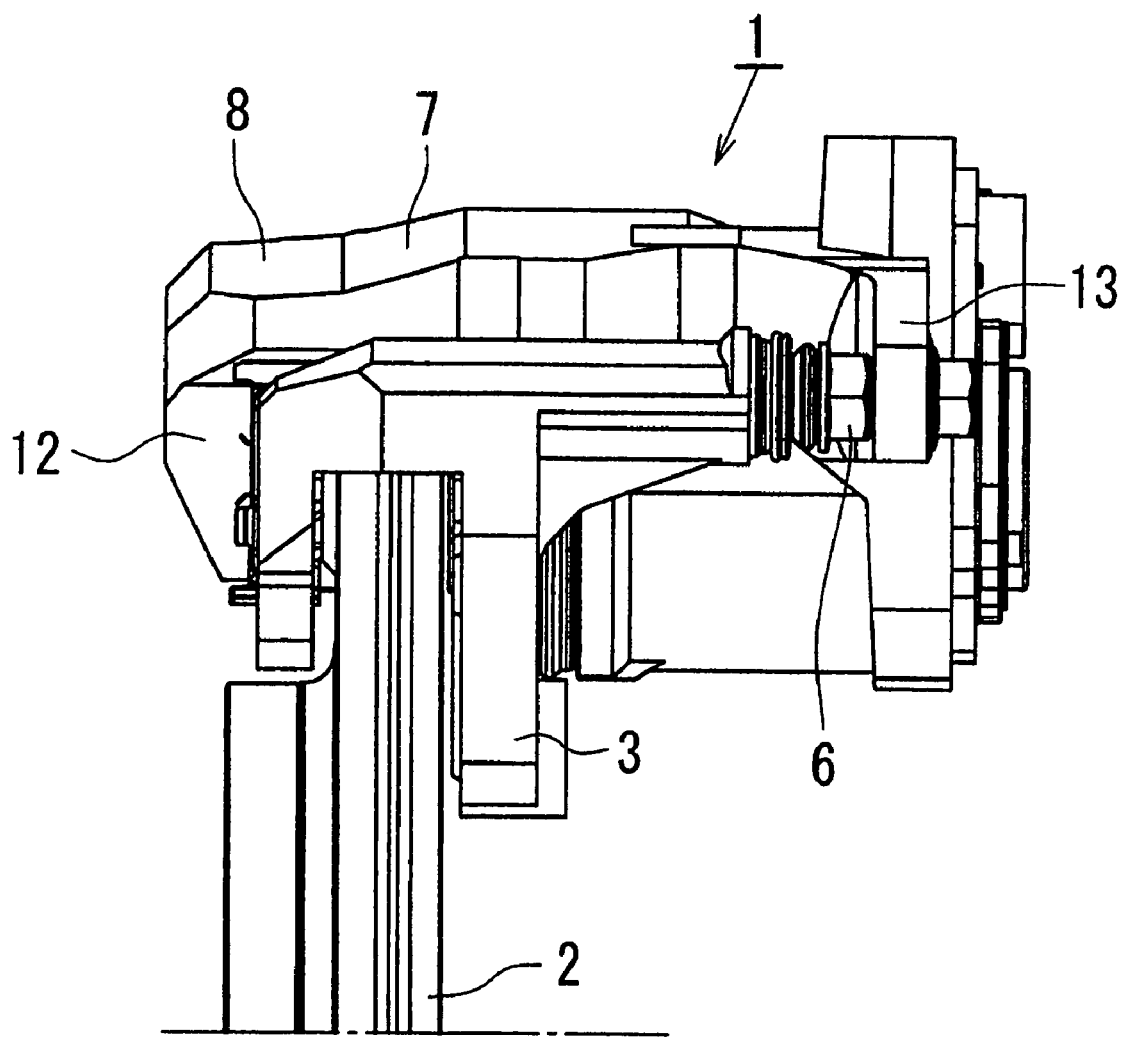
FIG. 4 is a front view of the electric disk brake of FIG. 2.
Figure 5:
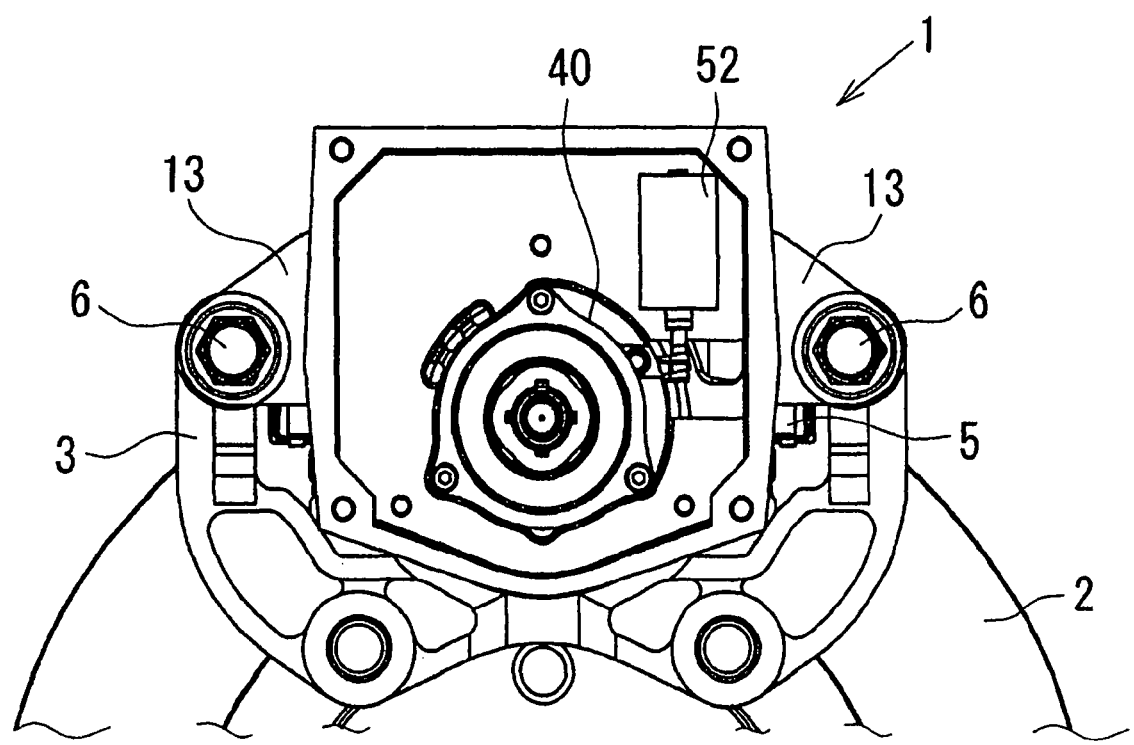
FIG. 5 is a side view of the electric disk brake of FIG. 2 as it appears when it is viewed from a piston of the electric disk brake.
Figure 6:
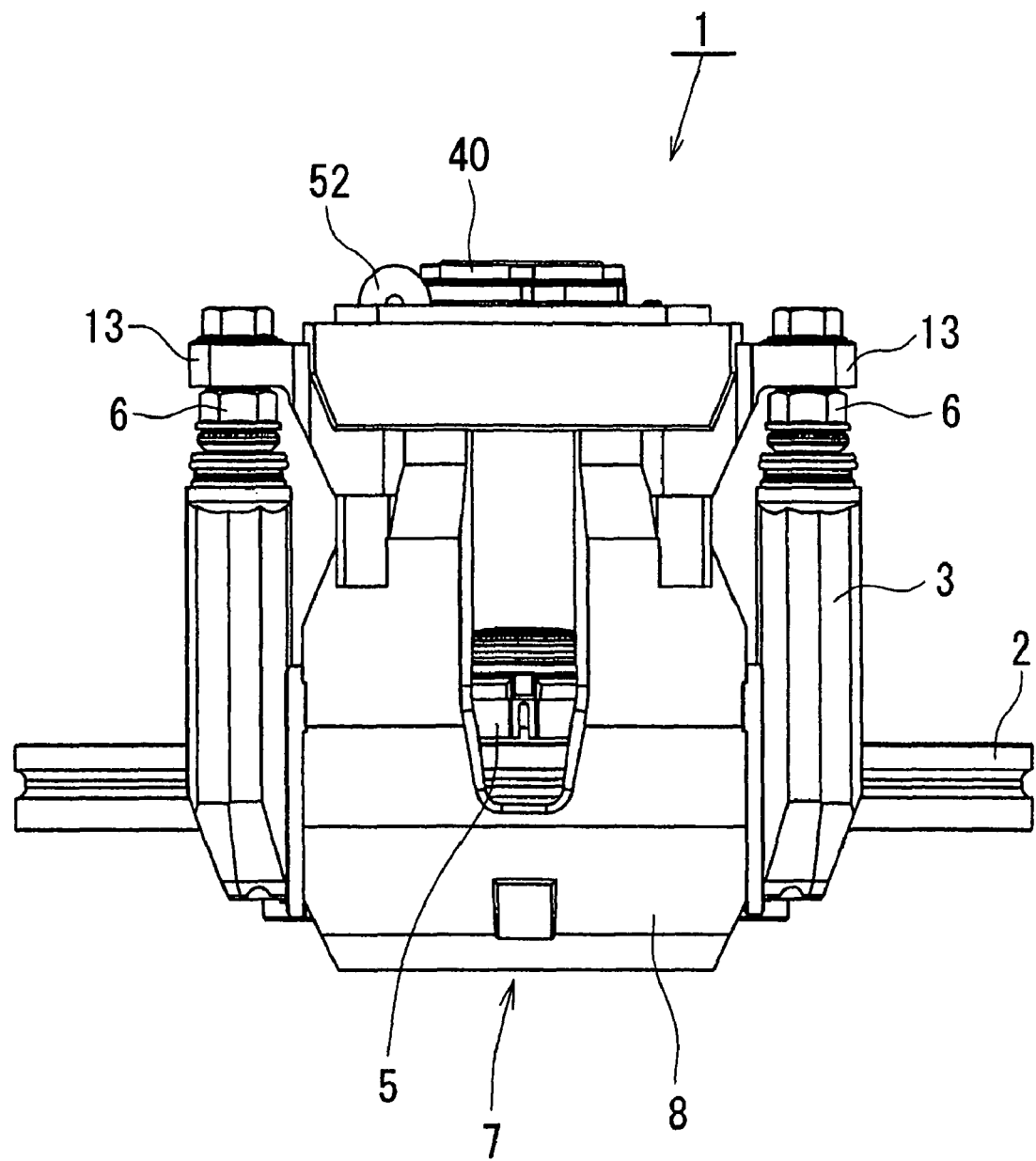
FIG. 6 is a plan view of the electric disk brake of FIG. 2.

Below, embodiments of the present invention will be described in detail with reference to the accompanying figures.

First, the first embodiment of the present invention will be described with reference to FIGS. 1 to 8. As shown in FIGS. 1 to 8, an electric disk brake 1 of the present embodiment is of a caliper floating type which comprises: a disk rotor 2 adapted to rotate with a wheel; a carrier 3 secured to a non-rotating portion (not shown) of a vehicle body such as a suspension member; a pair of brake pads 4 and 5 disposed on opposite sides of the disk rotor 2 and supported by the carrier 3; and an electric caliper (caliper) 7 disposed to straddle the disk rotor 2 and supported by a pair of slide pin bolts 6 so as to move relative to the carrier 3 along an axis of the disk rotor 2.

The electric caliper 7 comprises a caliper body 8, a piston unit 9, and a motor/controller unit 10.

The caliper body 8 comprises: a cylinder 11 defining a through-hole, an end of the through-hole being open to a surface of the disk rotor 2; a claw portion 12 extending from the cylinder 11 over the disk rotor 2 to an opposite side of the disk rotor 2; and a pair of bosses 13 being formed to extend from the cylinder 11 approximately in a direction of the diameter of the cylinder 11, and being provided with the respective slide pin bolts 6, such that the cylinder 11, the claw portion 12, and the pair of bosses 13 are integrally formed. On an inner-circumferential surface of the cylinder 11 are formed: a guide bore 15 into which a piston 14 (which will be described later) of a piston unit 9 is slidably fitted; and a female thread 18 which is adapted to engage with a male thread 17 of an adjustment screw 16 (which will be described later) attached to the piston unit 9.

The piston unit 9 is formed by integrating: a cylindrical piston (pressing member) 14 with a closed end; a ball ramp mechanism (rotary-to-linear motion conversion mechanism) 19 and a differential reduction mechanism 20 contained in the piston 14; and a pad wear compensation mechanism 21. The piston 14 is slidably fitted into the guide bore 15 of the caliper body 8 and is abutted against a brake pad 5, such that engagement with the brake pad 5 prevents the piston 14 from rotating. A portion between the piston 14 and the guide bore 15 is sealed with a dust seal 22 and a seal ring 23. It is to be noted that the pressing member is not limited to a cylindrical piston with a closed end, as used in the present embodiment; but a piston with a T-shaped cross section, as shown in Japanese Patent Public Disclosure No. 2000-304076, can also be used as long as the guide bore 15 can be sealed.

The ball ramp mechanism 19 comprises: a linear-motion disk 24 fixed to a bottom surface of the piston 14; a rotary disk 25 capable of moving in rotational and axial directions; and a ball (rolling member) 28 fitted into a space between ball grooves (inclined grooves) 26 and 27 that are formed on opposing surfaces of the linear-motion disk 24 and the rotary disk 25. The rotary disk 25 is always urged by a spring 29 towards the linear-motion disk 24. When the linear-motion disk 24 and the rotary disk 25 are rotated relative to each other, the ball 28 rolls in the space between the inclined ball grooves 26 and 27, causing the linear-motion disk 24 and the rotary disk 25 to move relative to each other in the axial direction, according to a rotational angle. In this way, rotary motion can be converted into linear motion.

The differential reduction mechanism 20 comprises: an eccentric shaft 30; a ring-shaped spur gear 32 having external teeth 32A and 32B, the spur gear 32 being rotatably fitted onto an eccentric portion 31 of the eccentric shaft 30; internal teeth 33 formed on the rotary disk 25 of the ball ramp mechanism 19, the internal teeth 33 meshing with the external teeth 32A of the spur gear 32; and a ring gear member 35 having internal teeth 34 which meshes with the external teeth 32B of the spur gear 32, the ring gear member 35 being supported so as to be capable of rotating relative to a rotary shaft of the eccentric shaft 30. One end of the eccentric shaft 30 is rotatably supported by the linear-motion disk 24 and the rotary disk 25, while the other end of the eccentric shaft 30 is formed to extend into the motor/controller unit 10, and an external spline 36 is formed on a tip of the other end of the eccentric shaft 30. One end of the ring gear member 35 is abutted via a thrust bearing 37 against an end of the rotary disk 25. In this way, when the spur gear 32 is revolved by rotating the eccentric shaft 30, differential rotation between the rotary disk 25, which has the inner teeth 33 meshing with the external teeth 32A of the spur gear 32, and the ring gear member 35, which has the internal teeth 34 meshing with the external teeth 32B, is performed. By fixing one of the rotary disk 25 and the ring gear member 35, rotation of the other can be decelerated at a predetermined speed reduction ratio.

The pad wear compensation mechanism 21 comprises: a limiter 38 disposed between the linear-motion disk 24 and the rotary disk 25 of the ball ramp mechanism 19; an adjustment screw 16 connected to the ring gear member 35 of the differential reduction mechanism 20; and a wave washer 38A disposed between the piston 14 and the adjustment screw 16. The limiter 38 has a torsion spring that urges the linear-motion disk 24 and the rotary disk 25 in a return direction with a certain play therebetween. The adjustment screw 16 has a male thread (trapezoidal thread) 17 formed on an outer circumference thereof, the male thread 17 meshing with a female thread (trapezoidal thread) 18 formed on the cylinder 11 of the caliper body 8. The adjustment screw 16 is held by the wave washer 38A with a certain retaining force so as not to rotate. When the adjustment screw 16 is rotated against this retaining force, relative rotation between the male thread 17 and the female thread 18 allows the adjustment screw 16 to move in the axial direction. Further, the adjustment screw 16 is adapted to receive a reaction force from the rotary disk 25 via the thrust bearing 37 and the gear member 35 and to transmit the force to the caliper body 8 via the male screw 17 and the female screw 18.

The motor/controller unit 10 comprises: a motor 39; a resolver (rotation detection means) 40 for detecting a rotational position of the motor 39; a parking brake mechanism 41 for fixing the rotational position of the motor 39; and a drive controller (controller) 42 for controlling operation of the motor 39, which are integrated by a base plate (plate member) 43.

The motor 39 is provided with a cylindrical motor case 44 with a closed end, the cylindrical motor case 44 being made of an iron-based material. The cylindrical motor case 44 is attached to a surface 43A of the base plate 43 made of aluminum that is connected to an end portion of the caliper body 8 and is inserted into the adjustment screw 16 of the piston unit 9. A motor stator 45 comprising a coil and so on is secured to an inner circumferential portion of the motor case 44. Bearings 46 and 47 are disposed at openings of a bottom portion of the motor case 44 and the base plate 43, respectively, such that a cylindrical motor rotor 48 is rotatably supported by the bearings 46 and 47. The motor case 44 is abutted on and supported by an inner circumferential surface of the cylinder 11 of the caliper body 8 so as not to move in a radial direction. The motor rotor 48 has an internal spline 49 formed on an inner circumferential portion thereof, the internal spline 49 being engaged with the external spline 36 of the eccentric shaft 30 of the piston unit 9, such that a rotational force can be transmitted between the motor rotor 48 and the eccentric shaft 30, and the motor rotor 48 and the eccentric shaft 30 are able to move relative to each other in the axial direction. In this manner, the motor 39 is unitized with the motor case 44 and the base plate 43. Therefore, the motor rotor 48 of the motor unit by itself can be rotated by applying an electrical current to the motor stator 45; and accordingly the motor unit can be inspected separately.

The resolver 40 comprises: a resolver stator 50 fixed to a surface 43B of the base plate 43 opposite to the motor 39; and a resolver rotor 51 attached to a tip of the motor rotor 48, that is opposed to the resolver stator 50 and inserted into the base plate 43. The resolver 40 is adapted to output an electric signal according to a relative rotation of the resolver stator 50 and the resolver rotor 51, the electric signal indicating a rotational speed and a rotational position of the motor rotor 48.

The parking brake mechanism 41 uses an electric actuator to operate a lock mechanism 52, thereby locking the motor rotor 48 so as to prevent it from rotating.

The drive controller 42 is a control circuit that is placed on a board attached to a side of the base plate 43 opposite to the motor 39. The drive controller 42 is connected via a wire 45A to the motor 39 and is also connected via a wire 50A to the resolver 40. The drive controller 42 is adapted to transmit a drive signal to the motor 39 to control rotation of the motor 39, based on: a braking-force signal emitted in response to a brake-pedaling operation by a driver or emitted from a vehicle-mounted controller (not shown) mounted on a vehicle body to perform an automatic braking control such as traction control or vehicle stability control; and a rotational-position signal emitted from the resolver 40. The base plate 43 is provided thereon with a cover 53 for the resolver 40 and the drive controller 42.

Since the motor 39 and the drive controller 42 are disposed on the base plate 43, they can be readily unitized into the motor/controller unit. Further, since the base plate 43 is disposed between the motor 39 and the drive controller 42, the drive controller 42 can be shielded from noise generated by the motor 39. Further, an electrical connection between the resolver 40 and the drive controller 42 can be easily made, since the resolver 40 and the drive controller 42 are disposed adjacent to each other on the base plate 43. In the present embodiment, the base plate 43 is made of aluminum, as a complicated shape can be formed by aluminum die casting or aluminum foundry. However, the material of the base plate 43 is not limited to aluminum, and a pressed steel plate or a molded resin can be used instead.

Next, operation of the present invention, as described in the above embodiment, will be described.

During a braking operation, the vehicle-mounted controller uses a brake-pedal sensor to detect a force (or an amount of displacement) that a driver exerted on a brake pedal. Based on the detected value, the vehicle-mounted controller transmits a braking-force signal to the drive controller 42 of the electric disk brake 1 of each wheel. The drive controller 42 outputs a drive voltage to the motor 39, based on the braking-force signal sent from the vehicle-mounted controller, to rotate the motor rotor 48 to a desired rotation angle, using a desired torque. Rotation of the motor rotor 48 is reduced by the differential reduction mechanism 20 at a predetermined speed reduction ratio and is converted by the ball ramp mechanism 21 into a linear motion to move the piston 14 forward, which presses the brake pad 5 disposed on one side against the disk rotor 2. This reaction force moves the caliper body 8 along the slide pin 6 of the carrier 3, whereby the claw portion 12 presses the brake pad 4 disposed on the other side against the disk rotor 2. During a brake release, the motor rotor 48 is rotated in a reverse direction to move the piston 14 backward and disengage the brake pads 4 and 5 from the disk rotor 2.

The vehicle-mounted controller uses various sensors to detect vehicle conditions such as a rotational speed of each vehicle, a vehicle speed, a vehicle acceleration, a steering angle, and a vehicle lateral acceleration. Based on these detected data, the vehicle-mounted controller controls rotation of the motor 39 to perform a boost control, an antilock control, a traction control, a vehicle stability control, and so on.

Next, operation of the differential reduction mechanism 20 and the pad wear compensation mechanism 21 will be described.

When the eccentric shaft 30 is rotated by the motor rotor 48 during a braking operation, eccentric rotation of the eccentric portion 31 revolves the spur gear 32. And the rotary disk 25 and the ring gear member 35, which are meshed with the external teeth 32A and 32B of the spur gear 32, perform a differential rotation. At this time, the ring gear member 35 and the adjustment screw 16 are normally prevented by the wave washer 38A from rotating. On the other hand, the rotary disk 25 can freely rotate within a play of the limiter 38. Therefore, only the rotary disk 25 rotates, whereby the ball ramp mechanism 21 moves the piston 14 forward to press the brake pads 4 and 5 against the disk rotor 2. After the brake pads 4 and 5 start to press against the disk rotor 2, its reaction force acts on the male screw 17 and the female screw 18. As a result, a frictional force between the male screw 17 and the female screw 18 increases to securely lock the adjustment screw 16, that is, the ring gear member 35, so as to prevent it from rotating. Therefore, the rotary disk 25 can rotate against a spring force of the limiter 38.

In a case that the brake pad 4 and 5 are worn to a degree such that the rotary disk 25 does not press against the disk rotor 2 even when it moves forward beyond the play of the limiter 38, a spring force of the limiter 38 acts on the rotary disk 25 to lock the rotary disk 25, and the adjustment screw 16 rotates with the ring gear member 35 against a retaining force of the wave washer 38A. In this way, the adjustment screw 16 moves forward through a relative rotation of the male screw 17 and the female screw 18 to advance the piston unit 9. When the brake pads 4 and 5 move forward by a depth of wear to start pressing against the disk rotor 2, its reaction force increases the frictional force between the male screw 17 and the female screw 18, as described above, so as to lock the adjustment screw 16 to prevent it from rotating. Thereafter, the rotary disk 25 rotates against the spring force of the limiter 38, such that the piston 14 is moved forward by the ball ramp mechanism 21. This enables the adjustment screw 16 to move the piston unit 9 forward by the depth of wear of the brake pads 4 and 5, whereby wear of the brake pads 4 and 5 can be compensated.

Figure 7:
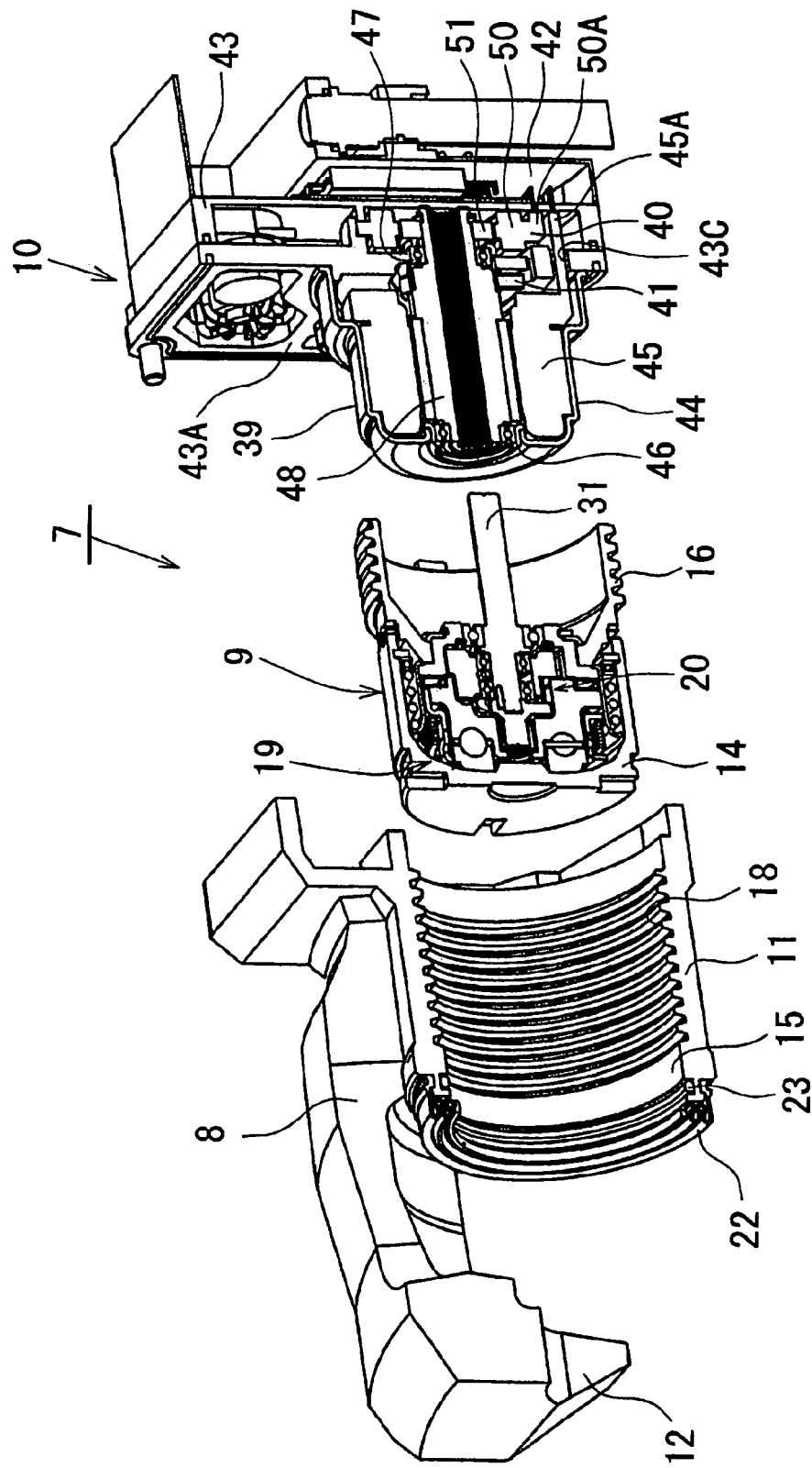
FIG. 7 is an exploded perspective view of the electric caliper of FIG. 1.
Figure 8:
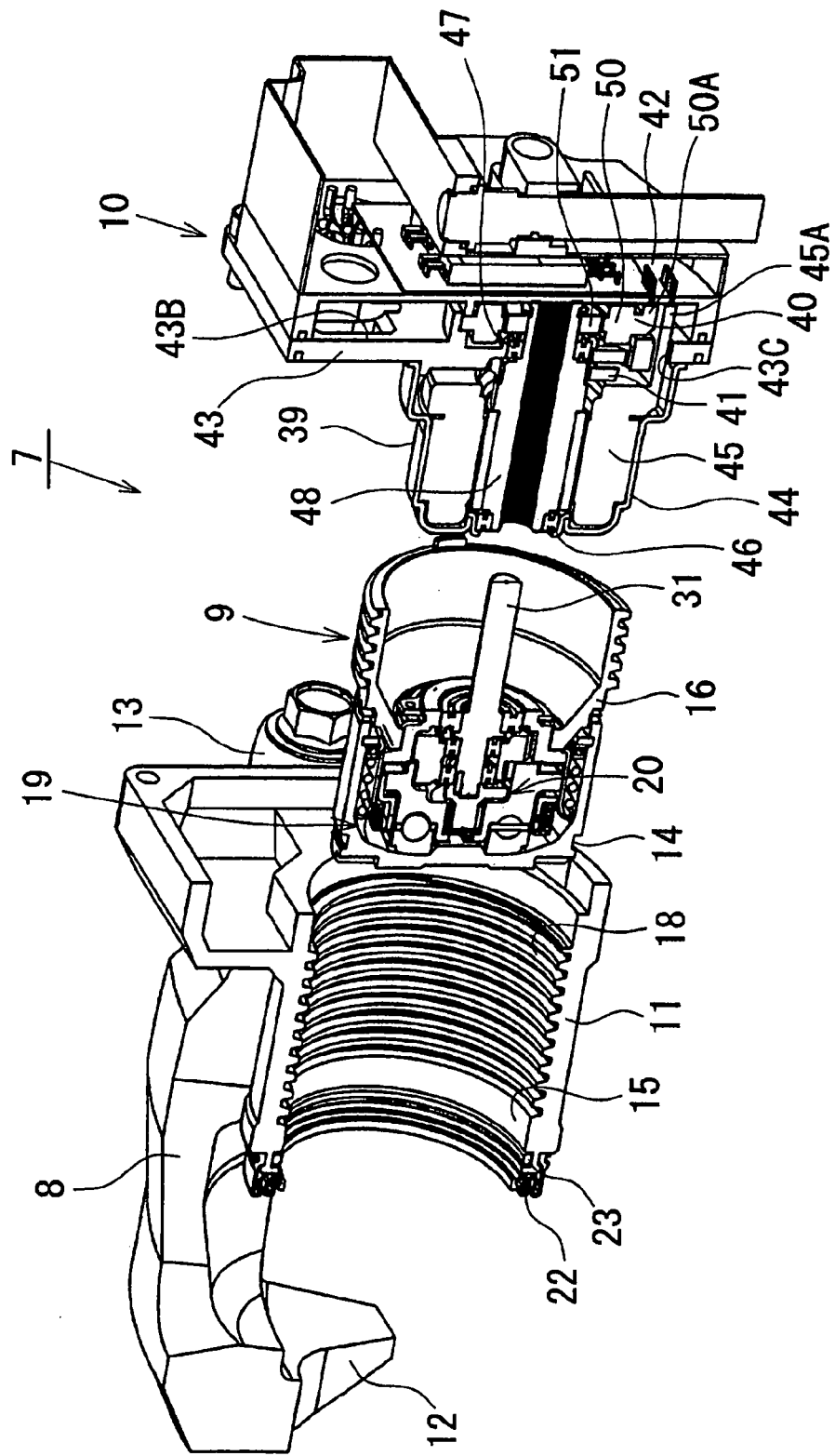
FIG. 8 is an exploded perspective view of the electric caliper of FIG. 1 as it appears when it is viewed from a different angle from FIG. 7.

Next, assemblage of the electric caliper 7 of the electric disk brake 1 will be described with particular reference to FIGS. 1, 7, and 8. The motor 39, the resolver 40, the parking brake mechanism 41, the drive controller 42, and so on are mounted on the base plate 43 to sub-assemble the motor/controller unit 10 (a first assembling step). In order to unitize the motor 39, the bearing 46 is first pressed into a bottom portion of the motor case 44 in this sub-assembling process; then the motor stator 45 is secured to an inner circumferential portion of the motor case 44. Next, an end of the motor rotor 48 is passed through an inner circumference of the motor stator 45 and fitted into an inner circumference of the bearing 46, which is pressed into the bottom portion of the motor case 44. After unitizing the motor 39, as described above, the bearing 47 is pressed into the surface 43A of the base plate 43. The other end of the motor rotor 48 is fitted into an inner circumference of the bearing 47, while the motor case 44 is mounted on the surface 43A of the base plate 43. At this time, the wire 45A extending from the motor stator 45 is passed through a through-hole 43C of the base plate 43.

After the motor 39 is mounted on the base plate 43 in the above-described manner, the resolver rotor 51 is secured to the other end of the motor rotor 48, and the resolver stator 50 is mounted on the surface 43B of the base plate 43, such that the resolver stator 50 becomes coaxial with the resolver rotor 51. Next, the lock mechanism 52 of the parking brake mechanism 41 is mounted on the surface 43B of the base plate 43.

Subsequently, the drive controller 42 is mounted on the surface 43B of the base plate 43, and the wire 45A of the motor stator 45 and the wire 50A of the resolver stator 50 are connected to the drive controller 42. Next, the cover 53 for the surface 43B of the base plate 43 is attached to the base plate 43 to complete the process of assembling the motor/controller unit 10.

Next, to inspect operation of the motor/controller unit 10 based on rotation of the motor 39 (inspection process), an electric current is applied to the drive controller 42 to rotate the motor 39. This inspection is carried out to check whether the motor rotor 48 rotates properly, whether a rotational-position signal is properly transmitted from the resolver 40, whether the rotation of the motor rotor 48 and the rotational-position signal transmitted from the resolver 40 are synchronized, and so on.

The piston 14, the ball ramp mechanism 19, the differential reduction mechanism 20, the pad wear compensation mechanism 21, and so on are sub-assembled to form the piston unit 9. Then the piston unit 9 is inserted into the cylinder 11 of the caliper body 8, and the adjustment screw 16 is screwed into the cylinder 11. Subsequently, the motor 39 of the motor/controller unit 10 is inserted into the adjustment screw 16. Next, a base of the motor case 44 is inserted, through the other end (one side) of the through-hole of the cylinder 11 of the caliper body 8, into the cylinder 11, such that the base plate 43 is connected to an end portion of the caliper body 8 (a second assembling step). At this time, the external spline 36 of the eccentric shaft 30 of the piston unit 9 is engaged with the internal spline 49 of the motor rotor 48. When the motor case 44 is inserted into the through-hole of the cylinder 11, an outer circumference of the base of the motor case 44 is abutted on the inner circumference of the cylinder 11 to guide the insertion of the motor/controller unit 10.

In this way, assemblage of the electric caliper 7 can be facilitated.

Since the piston unit 9 and the motor/controller unit 10 can be assembled in parallel processes, productivity can be enhanced. Further, the piston unit 9 and the motor/controller unit 10 can be inserted into and removed from the caliper body 8 through an end of the caliper body 8 opposite to the claw portion 12; therefore, assembly and disassembly can be facilitated. Since the piston unit 9 and the motor/controller unit 10 can be individually operated to inspect the operation, it is possible to detect in each of the individual units whether any defect exists during a manufacturing or repairing process. Therefore, quality inspection and defect checking can be conducted efficiently, and replacement of any defective component can be conducted for the units individually. Further, since the motor 39 and the drive controller 42 are integrated, wiring therebetween can be simplified, and a loss in power supplied to the motor 39 and adverse effects of noise can be reduced.

The caliper body 8 and the piston unit 9 are connected by the male screw 17 of the adjustment screw 16 and the female screw 18 of the cylinder 11. The area of engagement between the caliper body 8 and the piston unit 9 is reduced, which can facilitate dimensional control. Further, any load can be efficiently transmitted and supported by the connection between the male screw 17 and the female screw 18; therefore, a rigidity of the caliper can be enhanced, and the caliper can be reduced in size.

Next, the second to fourth embodiments of the present invention will be described with reference to FIGS. 9 to 11. It is to be noted that since the structure disclosed in the second to fourth embodiments is essentially the same as that disclosed in the first embodiment, with the exception of a part of the electric caliper, only electric calipers are illustrated in the figures. Further, those elements in the figures for the second to fourth embodiments which are the same as those shown in the figures for the first embodiment are denoted by like reference numerals; and further only those elements in the second to fourth embodiments that are different from those of the first embodiment will be described in detail.

Figure 9:
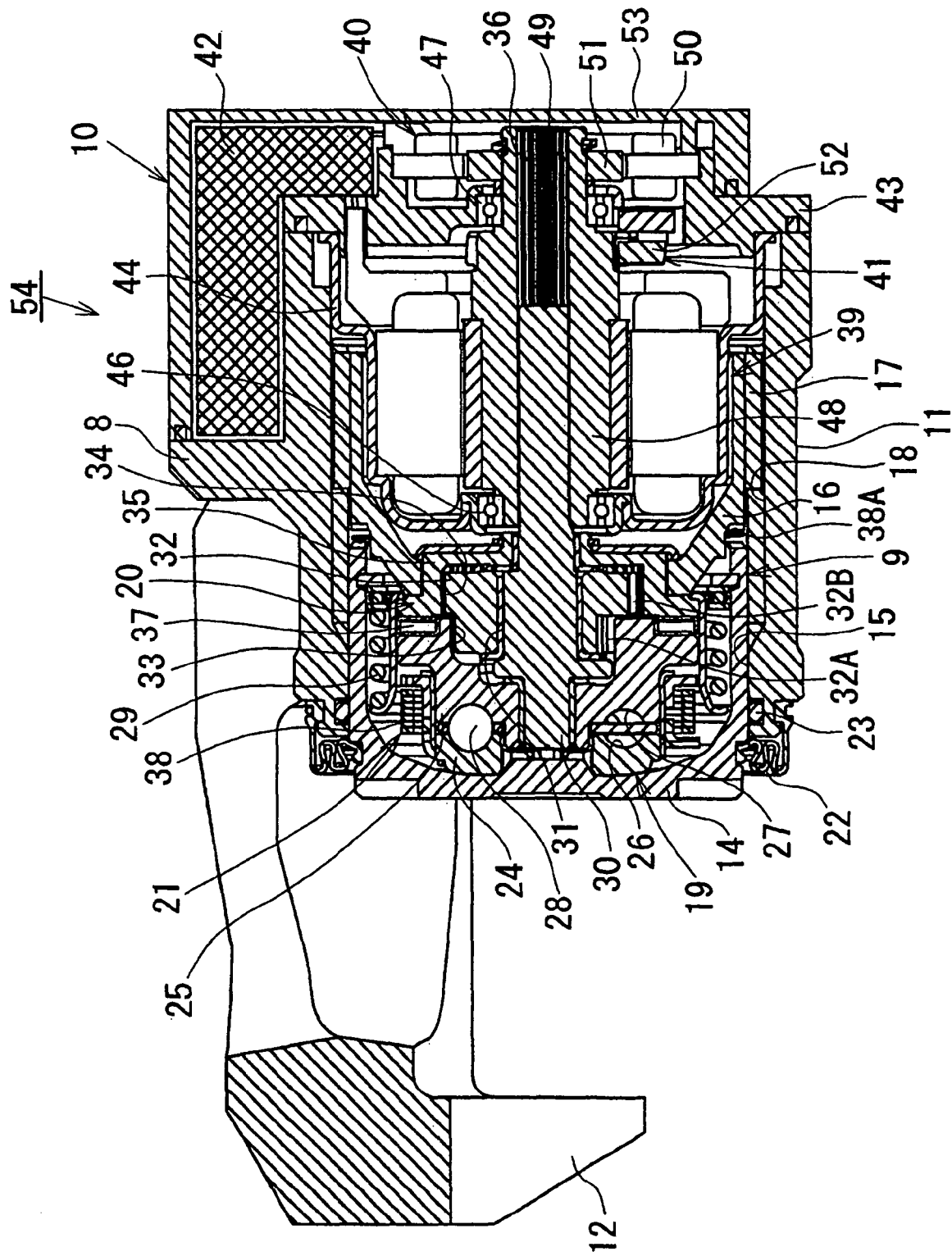
FIG. 9 is a longitudinal cross-sectional view of an electric caliper of an electric disk brake according to a second embodiment of the present invention.

As shown in FIG. 9, in an electric caliper 54 of an electric disk brake of the second embodiment, the drive controller 10 of the motor 39 is disposed on an upper position of the cylinder 11 of the caliper body 8, that is, an outer circumference of the motor 39. The cover 53 is disposed in the vicinity of the resolver 40. In this way, the axial dimension of the electric caliper 54 can be reduced.

Figure 10:
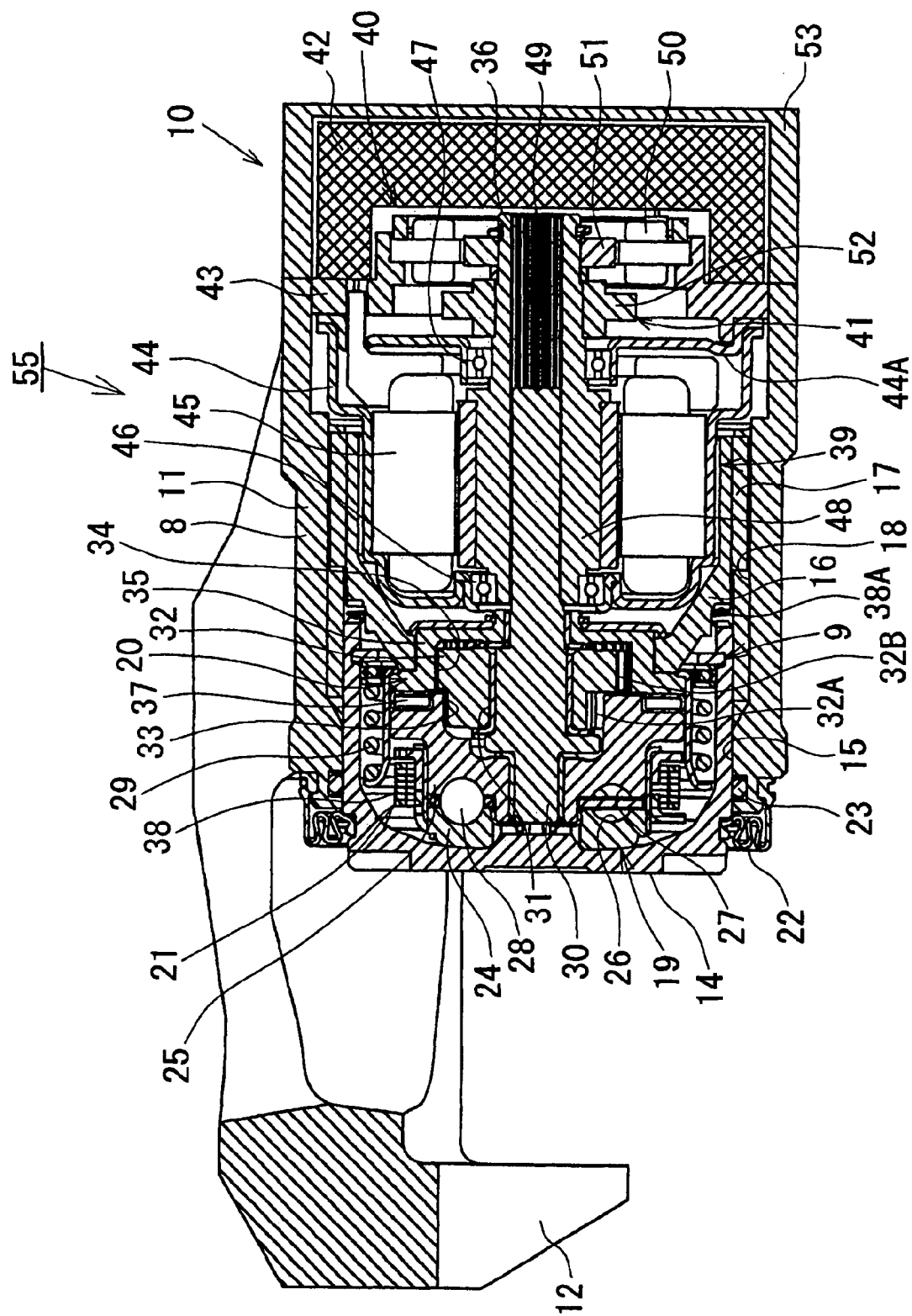
FIG. 10 is a longitudinal cross-sectional view of an electric caliper of an electric disk brake according to a third embodiment of the present invention.

As shown in FIG. 10, in an electric caliper 55 of an electric disk brake of the third embodiment, the drive controller 10 of the motor 39 is disposed at a rear portion of the piston unit 9. The bearing 47 of the motor rotor 48 is disposed, not on the base plate 43, but on the motor case 44A. The motor case 44 of the motor 39 does not abut on the inner circumference of the cylinder 11. The base plate 43 on which the motor 39 is mounted abuts on the inner circumference of the cylinder 11 to determine a position of the motor 39 in a radial direction. In this way, an increase in the axial dimension can be reduced to a minimum, while the radial dimension can also be reduced. In the first embodiment, when the caliper body 8 and the motor/controller unit 10 are assembled, precision is required in two respects, namely, in attaching the motor case 44 to the base plate 43, and in fitting the motor case 44 into the cylinder 11. In the present embodiment, however, precision is required only in fitting the base plate 43 into the cylinder 11. In this way, the manufacturing process is facilitated. Further, coaxial arrangement of the bearings 46 and 47 of the motor 39 can be made easily. Further, the motor 39 alone can be operated to rotate the motor rotor 48. This makes it possible to inspect the motor 39 alone.

Figure 11:
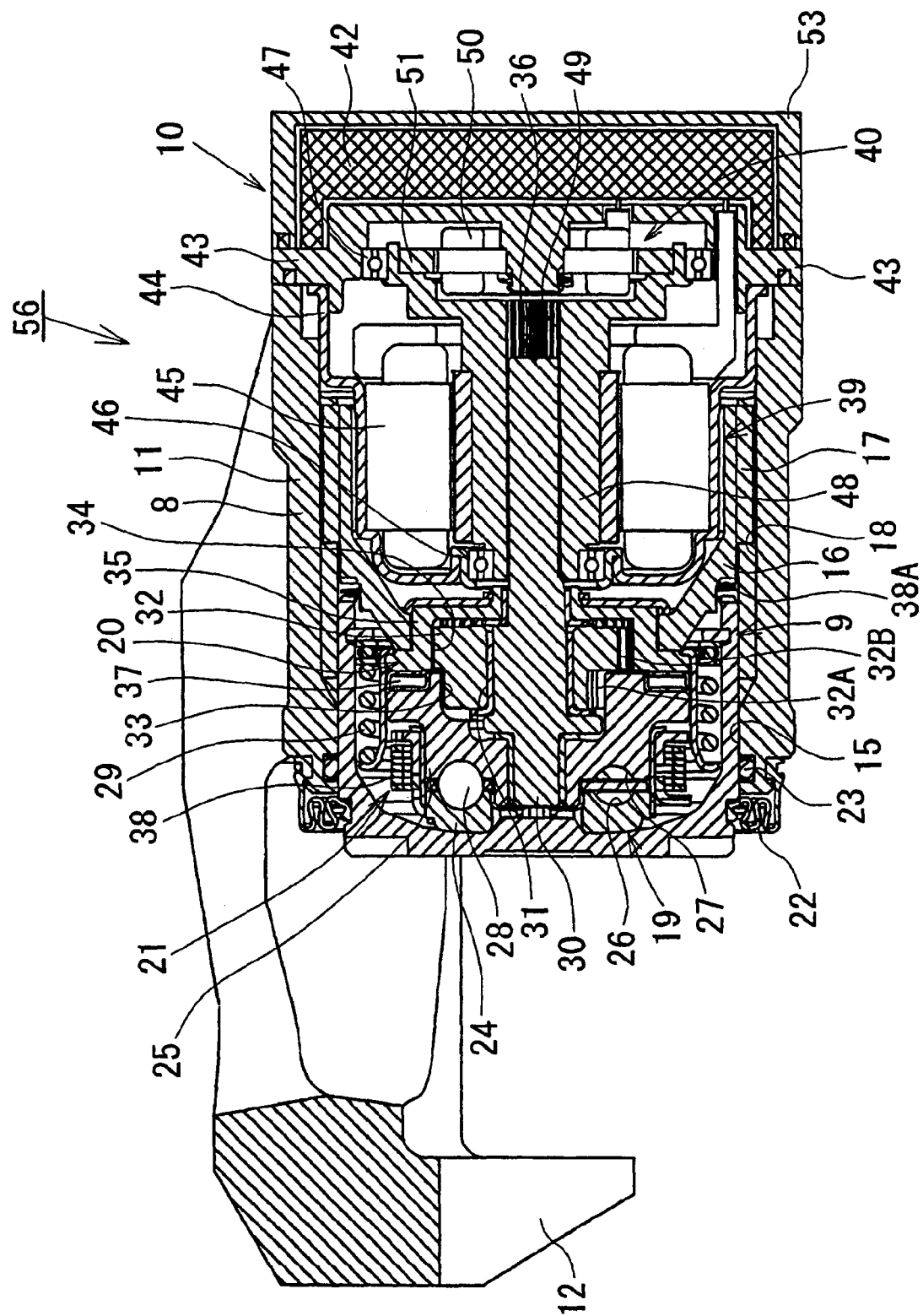
FIG. 11 is a longitudinal cross-sectional view of an electric caliper of an electric disk brake according to a fourth embodiment of the present invention.

As shown in FIG. 11, in an electric caliper 56 of an electric disk brake of the fourth embodiment, the diameters of the bearing 47 and a portion of the motor rotor 48 supported by the bearing 47 are increased to dispose the resolver 40 in an inner circumferential portion of the bearing 47 and the supported portion of the motor rotor 48. The resolver 40 is disposed on the same side of the base plate 43 as the motor 39. The ring-shaped resolver rotor 51 is fitted into an inner circumference of the portion of the motor rotor 48 supported by the bearing 47, while the resolver stator 50, which is disposed to face an inner circumferential surface of the resolver rotor 51, is secured to the base plate 43.

The drive controller 10 is disposed at a rear portion of the piston unit 9. Therefore, axial and lateral dimensions can be reduced.

In each of the above-described embodiments, the motor and the controller are integrated to form a motor/controller unit. Therefore, an assembling process can be facilitated, and operation of the motor/controller unit can be inspected before the unit is combined with other parts.

In the above-described first to fourth embodiments, the ball ramp mechanism 19 is used as a rotary-to-linear motion conversion mechanism; however, another conventional rotary-to-linear motion conversion mechanism such as a ball-screw mechanism, a roller-screw mechanism, or a roller ramp mechanism can be used instead. Further, instead of assembling the motor/controller unit 10 in the first to fourth embodiments, the motor case 44, the motor stator 45, and the motor rotor 48 can be integrated as a motor unit. The motor unit can be incorporated into the caliper body 8, and can then be integrated with the drive controller 42. In this way, before being incorporated into the caliper body 8, the motor unit can be operated and inspected by being connected to a drive source for transmitting a drive signal, rather than being connected to the drive controller 42.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2006-99761 filed on Mar. 31, 2006 including specification, claims, drawings and summary is incorporated herein by reference in its entirety.

What is claimed is:

1. A caliper for an electric disk brake, the caliper comprising:
a pressing member for pressing a brake pad against a disk rotor;
an electric motor;
a rotary-to-linear motion conversion mechanism for converting a rotary motion of the electric motor to a linear motion to transmit the linear motion to the pressing member, the pressing member being moved forward according to rotation of the electric motor to press the brake pad against the disk rotor to exert a braking force;
a bearing for receiving a reaction force, the reacting force acting on the pressing member when the pressing member presses the brake pad against the disk rotor; and
a motor/controller unit which is formed by integrating the electric motor and a controller for controlling the electric motor, wherein:
the caliper comprises a caliper body defining a cylinder for containing the pressing member, the rotary-to-linear motion conversion mechanism, and the motor;
the motor comprises a motor stator, a motor rotor, and a motor case to which the motor stator is secured;
the integrated motor/controller unit can be mounted on the caliper body, by the motor case of the motor being inserted into the cylinder; and
the bearing is arranged inside the cylinder such that the reacting force is not transferred to the motor case;
the motor/controller unit includes a plate member;
the motor case of the motor includes a bearing attached thereto;
the plate member includes a bearing attached thereto; and
the motor rotor is rotatably supported by the bearing of the motor case and the bearing of the plate member.

2. A caliper for an electric disk brake according to claim 1, wherein:
the motor case of the motor comprises a small-diameter portion and a large-diameter portion which is larger than the small-diameter portion, and
an outer circumferential portion of the large-diameter portion of the motor case is abutted on an inner circumference of the cylinder, such that the motor is supported so as not to move in a radial direction.

3. A caliper for an electric disk brake according to claim 1, wherein:
the motor case of the motor is disposed on one surface of the plate member, while the controller is disposed on another surface of the plate member;
an opening of the cylinder containing the motor case is closed by the plate member.

4. A caliper for an electric disk brake according to claim 1, wherein:
the caliper body includes a claw portion integrated therewith and extending from the cylinder over the disk rotor to an opposite side of the disk rotor;
the motor case comprises a small-diameter portion, and a large-diameter portion on an opposite side of the small diameter portion relative to the claw portion; and
the motor case is supported by the outer circumferential portion of the large-diameter portion of the motor case abutting against the inner circumferential portion of the through-hole of the cylinder.

5. An electric disk brake including a caliper that has:
a pressing member for pressing brake pads;
an electric motor;
a motor/controller unit which is formed by integrating the electric motor and a controller for controlling the electric motor; and
a rotary-to-linear motion conversion mechanism for converting a rotary motion of the motor to a linear motion to transmit the linear motion to the pressing member,
the pressing member being adapted to move forward according to rotation of the motor to press one of the brake pads against a disk rotor to exert a braking force, wherein:

the caliper defines a cylinder for containing the pressing member, the rotary-to-linear motion conversion mechanism, and the motor, the cylinder including a through-hole;

the caliper further includes a claw portion integrated with the cylinder and extending from the cylinder over the disk rotor to an opposite side of the disk rotor, the claw portion being adapted to, when one of the brake pads is pressed against one side of the disk rotor by the pressing member, press the other of the brake pads against the other side of the disk rotor;

the motor is integrated as a motor unit including a motor stator, a motor rotor, and a motor case for containing the motor stator and the motor rotor;

the motor/controller unit is inserted from an opposite side of the through-hole of the cylinder to the claw portion to be operably coupled to the rotary-to-linear motion conversion mechanism;

the motor case comprises a small-diameter portion, and a large-diameter portion on an opposite side of the small diameter portion in relation to the claw portion; and the motor case is supported by the outer circumferential portion of the large-diameter portion of the motor case abutting against the inner circumferential portion of the through-hole of the cylinder.

6. An electric disk brake according to claim 5, wherein a reduction mechanism is provided between the motor and the rotary-to-linear motion conversion mechanism, and the reduction mechanism includes a shaft for inputting rotation of the reduction mechanism, a rotational force is transmitted between the shaft of the reduction mechanism and the motor rotor, and the shaft is connected to the motor rotor such that the shaft can be axially moved relative to the motor rotor.

7. An electric disk brake according to claim 5, wherein the motor/controller unit includes a plate member, the motor case of the motor includes a bearing attached thereto, the plate member includes a bearing attached thereto, and the motor rotor is rotatably supported by the bearing of the motor case and the bearing of the plate member.

8. An electric disk brake according to claim 5, wherein the controller is disposed radially outwardly of the motor case and the motor stator of the motor.

9. An electric disk brake including a caliper that has:
a pressing member for pressing brake pads;
an electric motor; and
a rotary-to-linear motion conversion mechanism for converting a rotary motion of the motor to a linear motion to transmit the linear motion to the pressing member, the pressing member being adapted to move forward according to rotation of the motor to press one of the brake pads against a disk rotor to exert a braking force, wherein:

the caliper defines a cylinder for containing the pressing member, the rotary-to-linear motion conversion mechanism, and the motor;

the caliper further includes a claw portion integrated with the cylinder and extending from the cylinder over the disk rotor to an opposite side of the disk rotor, the claw portion being adapted to, when one of the brake pads is pressed against one side of the disk rotor by the pressing member, press the other of the brake pads against the other side of the disk rotor;

the motor is integrated as a motor unit including a motor stator, a motor rotor, and a motor case for containing the motor stator and the motor rotor, the motor case comprises a small-diameter portion and a large-diameter portion;

the motor case is supported by the outer circumferential portion of the large-diameter portion of the motor case abutting against the inner circumferential portion of the cylinder; and the motor stator is fixed to an inner circumferential portion of the small-diameter portion of the motor case.

10. A caliper for an electric disk brake according to claim 9, wherein:

a differential reduction mechanism is provided between the motor and the rotary-to-linear motion conversion mechanism;

the differential reduction mechanism includes a shaft for inputting rotation of the differential reduction mechanism;

a rotational force is transmitted between the shaft of the differential reduction mechanism and the motor rotor; and the shaft is connected to the motor rotor such that the shaft can be axially moved relative to the motor rotor.

11. An electric disk brake according to claim 9, wherein the cylinder comprises a through-hole, the motor is arranged in the through-hole such that the small-diameter portion is located in the claw portion side of the through-hole and the large-diameter portion is located in an opposite side of the through-hole of the cylinder to the claw portion, and the motor rotor is operably connected to the rotary-to-linear motion conversion mechanism.

12. An electric disk brake including a caliper that has:
a pressing member for pressing brake pads;
an electric motor; and
a rotary-to-linear motion conversion mechanism for converting a rotary motion of the motor to a linear motion to transmit the linear motion to the pressing member, the pressing member being adapted to move forward according to rotation of the motor to press one of the brake pads against a disk rotor to exert a braking force, wherein:

the caliper defines a cylinder for containing the pressing member, the rotary-to-linear motion conversion mechanism, and the motor;

the caliper further includes a claw portion integrated with the cylinder and extending from the cylinder over the disk rotor to an opposite side of the disk rotor, the claw portion being adapted to, when one of the brake pads is pressed against one side of the disk rotor by the pressing member, press the other of the brake pads against the other side of the disk rotor;

the motor is integrated as a motor unit including a motor stator, a motor rotor, and a motor case for containing the motor stator and the motor rotor, a differential reduction mechanism is disposed between the electric motor and the rotary-to-linear motion conversion mechanism;

the motor rotor of the motor has a cylindrical shape;

a shaft for inputting rotation of the differential reduction mechanism is engaged with an inner circumferential portion of the motor rotor;

a rotational force is transmitted between the shaft of the differential reduction mechanism and the motor rotor; and the shaft is axially movable relative to the motor rotor.

13. An electric disk brake according to claim 12, wherein the motor rotor of the motor is cylindrical, an internal spline is formed on the inner circumferential portion of the motor rotor,
an external spline is formed on the shaft for inputting rotation of the differential reduction mechanism, and
the external spline is engaged with the internal spline of the motor rotor.

14. A caliper for an electric disk brake the caliper comprising:
a pressing member for pressing a brake pad against a disk rotor;
an electric motor;
a rotary-to-linear motion conversion mechanism for converting a rotary motion of the electric motor to a linear motion to transmit the linear motion to the pressing member, the pressing member being moved forward according to rotation of the electric motor to press the brake pad against the disk rotor to exert a braking force; and
a motor/controller unit which is formed by integrating the electric motor and a controller for controlling the electric motor, wherein:
the caliper comprises a caliper body defining a cylinder for containing the pressing member, the rotary-to-linear motion conversion mechanism, and the motor;
the motor comprises a motor stator, a motor rotor, and a motor case to which the motor stator is secured;
the integrated motor/controller unit can be mounted on the caliper body, by the motor case of the motor being inserted into the cylinder;
a reduction mechanism is provided between the motor and the rotary-to-linear motion conversion mechanism;
the reduction mechanism includes a shaft for receiving a rotation force from the motor rotor to rotate the reduction mechanism;
the motor rotor of the motor and the shaft of the reduction mechanism are adapted to transmit the rotation force between each other; and
the shaft is connected to the motor rotor such that the shaft can be axially moved relative to the motor rotor.

15. A caliper for an electric disk brake according to claim 14, wherein:
the motor rotor of the motor is cylindrical;
an internal spline is formed on the inner circumferential portion of the motor rotor;
an external spline is formed on the shaft for inputting rotation of the reduction mechanism, and
the external spline is engaged with the internal spline of the motor rotor.

16. A caliper for an electric disk brake according to claim 14, wherein
the motor/controller unit includes a plate member,
the motor case of the motor includes a bearing attached thereto,
the plate member includes a bearing attached thereto, and
the motor rotor is rotatably supported by the bearing of the motor case and the bearing of the plate member.

17. A caliper for an electric disk brake according to claim 14, further comprising:
a bearing for receiving a reaction force, the reacting force acting on the pressing member when the pressing member presses the brake pad against the disk rotor; and
the bearing being arranged inside the cylinder such that the reacting force is not transferred to the motor case.

* * * * *